United States Patent [19]
Folsom

[11] Patent Number: 5,280,932
[45] Date of Patent: Jan. 25, 1994

[54] SHOPPING CART ADVERTISING DISPLAY DEVICE

[75] Inventor: Albert P. Folsom, San Diego, Calif.

[73] Assignee: Purchase Point Media Corp., San Diego, Calif.

[21] Appl. No.: 85,454

[22] Filed: Jun. 30, 1993

Related U.S. Application Data

[63] Continuation of Ser. No. 818,825, Jan. 10, 1992, abandoned, which is a continuation-in-part of Ser. No. 639,269, Jan. 10, 1991, abandoned.

[51] Int. Cl.⁵ .............................................. B62B 3/02
[52] U.S. Cl. .............................................. 280/33.992
[58] Field of Search ..................... 280/33.991, 33.992, 280/33.993, 33.996, DIG. 4

[56] References Cited

FOREIGN PATENT DOCUMENTS 0341029  11/1989  European Pat. Off. ........ 280/33.992
2623154   5/1989  France ............................ 280/33.992
2176332  12/1986  United Kingdom ........... 280/33.992

Primary Examiner—Richard M. Camby
Attorney, Agent, or Firm—Calif Tervo

[57] ABSTRACT

A waterproof advertising display device includes a captive calculator and is particularly adapted for use on a shopping cart of the telescopingly nestable type. Broadly speaking, the display device includes a display plate for mounting on the front wall of a shopping cart upper rear receptacle and for receiving advertising copy and a transparent cover plate attached with keyed quick release fastener and forward release hinge over the advertising copy to the display plate. A tongue and groove seal between the plates keeps water from the advertising copy. A calculator assembly is attached to the upper right of the cover plate and includes a slanted blind channel shelf for holding a captive calculator at a preferred angle for use by a shopper. A plug/bumper attached after insertion of the calculator prevents calculator removal and protects the calculator from impact upon nesting of shopping carts.

19 Claims, 4 Drawing Sheets

SHOPPING CART ADVERTISING DISPLAY DEVICE

This application is a continuation of Ser. No. 07/818,825 filed Jan. 10, 1992 abandoned, which is a continuation-in-part application of application Ser. No. 639,269 filed Jan. 10, 1991 now abandoned.

BACKGROUND OF THE INVENTION

1. Field of the Invention

This invention is a waterproof advertising display device including a captive calculator. The display device is particularly adapted for use on a shopping cart of the telescopingly nestable type wherein the device is attached to the cart rear receptacle and the calculator is slanted relative to the remainder of the display.

2. Background of the Invention

Typically, in modern self-help shopping the customer pushes a wheeled push cart about the store. Items to be purchased are placed in the cart and taken to a check out stand. Basically a customer is left to his own devices to find items, to compare price, and to know if he has sufficient funds to cover the total. The customer takes the cart outside and after placing purchased items in his car, he leaves the cart in a parking lot storage area where it is subjected to the weather.

Typically, also, many modern shopping carts are of the type that can be telescopingly nested, that is they can be partially wheeled one inside the other. In this manner they can be stored in a smaller area and can be moved in mass from outside holding areas to inside the store for customer pickup.

Therefore, it is desirable to have a display device on the shopping cart displaying shopping information, such as a store index or special sale items or other advertising, as an aid to the customer. It is further desirable that the display is protected from the elements, particularly rain and water, and yet be easily changeable to reflect changes in item location and price. It is also desirable to incorporate a calculator into such display device and to protect the calculator from theft.

It is further desirable that such a waterproof and easily changeable display device incorporating a calculator be adapted for use on a telescopingly nestable shopping cart.

SUMMARY OF TH INVENTION

This invention is a waterproof advertising display device including a captive calculator. The display device is particularly adapted for use on a shopping cart of the telescopingly nestable type.

Broadly speaking, the display device includes a display plate for mounting on the front wall of a shopping cart upper rear receptacle and for receiving advertising copy and a transparent cover plate attached with keyed quick release fastener and forward release hinge over the advertising copy to the display plate. A tongue and groove seal between the plates keeps water from the advertising copy.

In a preferred embodiment, a calculator assembly is attached to the upper right of the cover plate and includes a slanted blind channel shelf for holding a captive calculator at a preferred angle for use by a shopper. A plug/bumper attached after insertion of the calculator prevents calculator removal and protects the calculator from impact upon nesting of shopping carts.

In an alternate embodiment, the display plate top end includes a channel for receiving the cover plate top end, and the sealing tongue and groove travel along the channel rear wall.

Other features and many attendant advantages of the invention will become apparent upon a reading of the following detailed description together with the drawings, in which like reference numerals refer to like parts throughout.

DETAILED DESCRIPTION OF THE INVENTION

Figure 1:
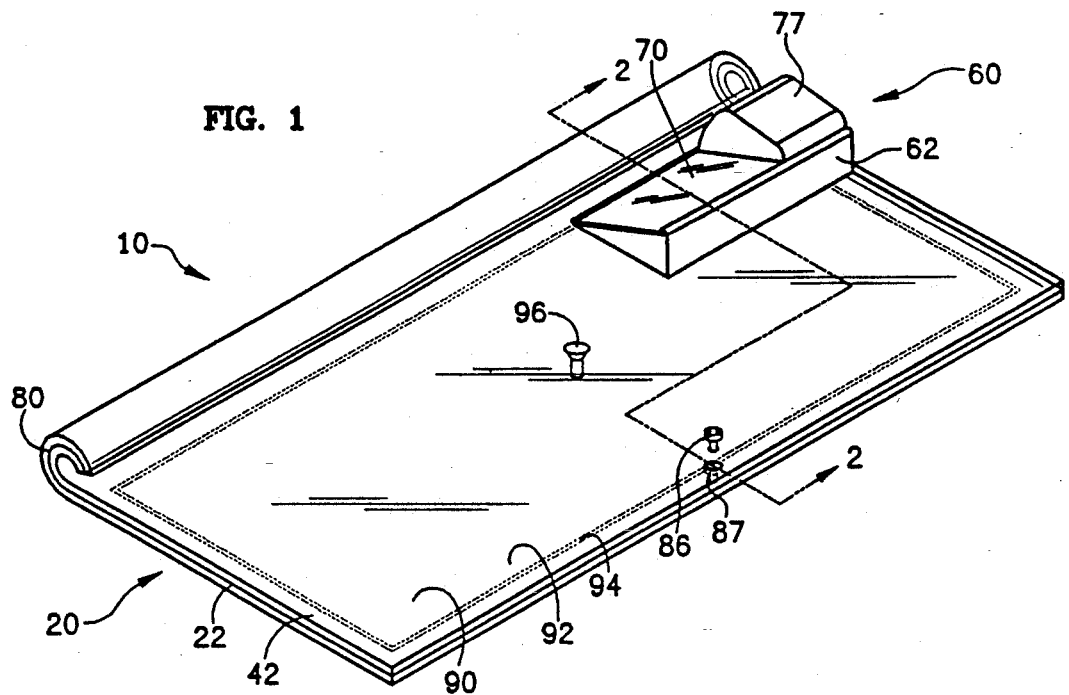
FIG. 1 is a perspective view of a preferred embodiment of the waterproof advertising display device of the present invention.
Figure 2:
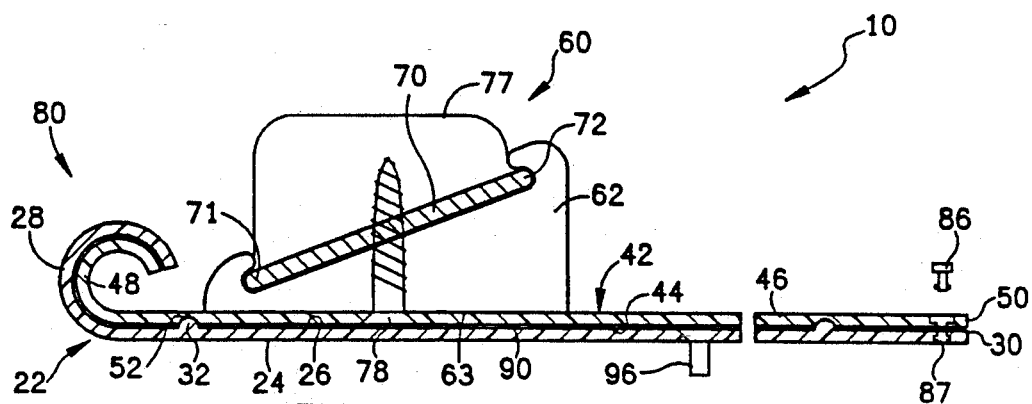
FIG. 2 is a sectional view taken on line 2—2 of FIG. 1.

With reference now to the drawings, and more particularly to FIGS. 1 and 2 thereof, there is shown a preferred embodiment of the advertising display device, denoted generally as 10, of the present invention. FIG. 1 is a perspective view of the advertising display device 10 and FIG. 2 is a sectional view of the advertising display device 10 taken on line 2—2 of FIG. 1. Advertising display device 10 is mounted on a shopping cart or the like as an aid to the shopper.

Advertising display device 10 generally comprises an advertising holder 20 and a calculator assembly 60.

Holder 20 provides a means for retaining and displaying display ad 90, for mounting the holder, such as on a shopping cart, and for protecting display ad 90 from the elements, such as physical defacing and moisture. Also, holder 20 should allow display ad 90 to be quickly and easily changed.

The advertising holder 20 generally comprises a rear plate or display plate 22 and a front plate or cover plate 42. A display ad 90 is placed or sandwiched in a display area 92 between display plate 22 and cover plate 42. Display plate 22 includes a back face 24, front face 26, a top edge 28 and a bottom edge 30. Cover plate 42 includes a back face 44, a front face 46, a top edge 48 and a bottom edge 50. Cover plate 42 is transparent over the display area 92 so that the display ad 90 therein is visible. Plates 22, 42 are preferably made of transparent material, such as plastic.

Sealing means 94, such as tongue 32 protruding from display plate 22 and receiving groove 52 in cover plate, prevents liquid and dirt from reaching display ad 90. In the preferred embodiment of FIG. 1, sealing means 94 completely encompasses and delineates display area 92. Tongue 32 also serves as retainer for display ad 90.

Holder top edges 28,48 are attached, such as by front release hinge means, such as hinge 80, and holder bottom edges 30,50 are attached by keyed quick release fastener means, such as quarter-turn fastener 86. Quarter-turn fastener 86 is disposed and retained in accommodating receiving bore 87. Preferably, the top of fastener 86 includes a keying or locking means, such as being flat except for a couple of blind bores, so that a special mating keying tool is required to activate it.

Releasing fastener 86 allows cover plate 42 to be rotated about hinge 80 to access display ad 90. Hinge 80 is designed such that upon rotation of cover plate 42 to a release angle, hinge 80 will disengage, that is cover plate 42 can be completely removed forwardly from display plate 22. As best seen in FIG. 1, one of the plates, in this case display plate 22, wraps around the curled end of the other plate to form the outside enveloping surface of hinge 80. This surface is continuous and consequently it prevents liquid from entering between the plates 22,42 at the hinge area.

Holder 20 is adapted to be attached to a shopping cart or the like with means, such as rivets 96 through display plate 22. Sealing means, such as a resilient sealant, may be used for sealing the rivet aperture as part of the waterproofing.

Calculator assembly 60 is attached to cover plate front face 46 near top edge 48 adjacent one side. Calculator assembly 60 generally includes a stand-off means, such as stand-off 62, a calculator 70, and a plug and bumper means, such as plug 77.

Calculator 70 is of well-known design and includes the standard math functions to aid the shopper in deciding the best offer and in totaling purchases. Preferably, calculator 70 is solar powered. Calculator 70 is waterproof.

Base 63 of stand-off 62 is attached to cover plate front face 46 such as by gluing. A shelf means, such as blind channel 64 in the top of stand-off 62 retains and supports calculator 70. Channel 64 is slanted top to bottom such that calculator top edge 71 is nearer cover plate 42 than is calculator bottom edge 72. This provides a better angle for use of the calculator by the shopper.

Channel 64 is closed on the left end and calculator 70 is feed into channel 64 from the right end. Plug 77 retains calculator 70 within channel 64. The bottom of plug 77 fits into channel 64 behind calculator 70. Fastener means, such as screw 78, accessible from the back face 44 of cover plate 42, retains plug 77 in position. Thus, the keyed fastener 86 must be actuated to access display ad 90 and to access plug fastener 78 to remove calculator 70.

Plug 77 is the highest element above advertising holder 20 and also serves as a bumper means for protecting calculator from impacts.

Figure 5:
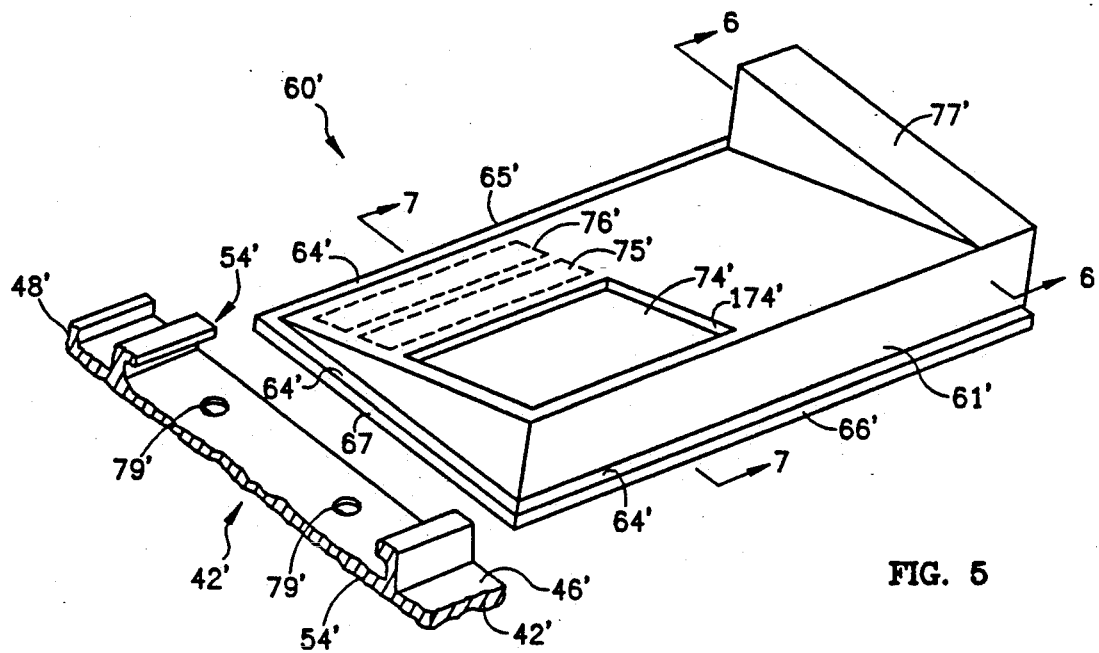
FIG. 5 is a cut-away perspective view of another preferred embodiment of the calculator assembly of the invention.
Figure 6:
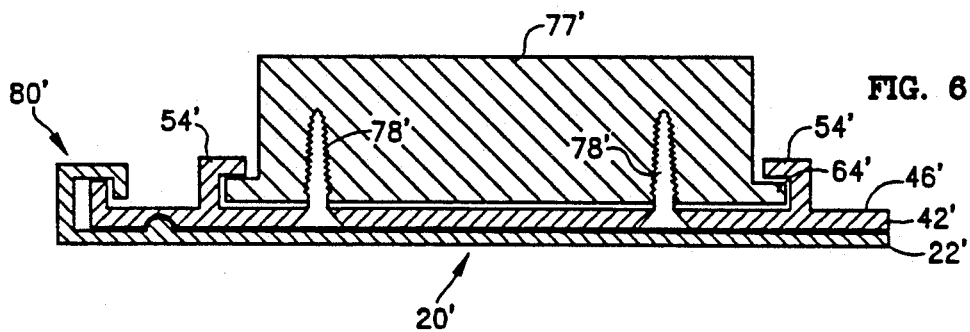
FIG. 6 is an enlarged sectional view taken on line 6—6 of FIG. 5 through of the bumper/plug portion of the calculator assembly.
Figure 7:
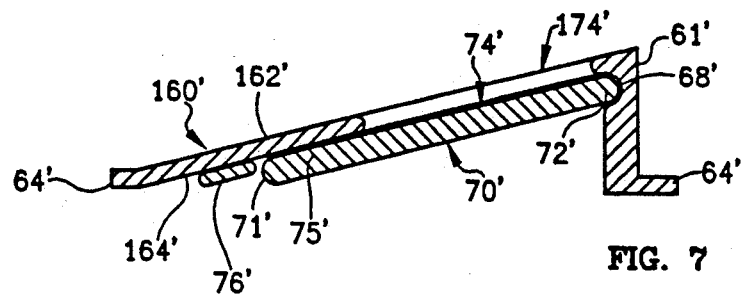
FIG. 7 is an enlarged sectional view taken on line 7—7 of FIG. 5 through the captive calculator.

FIGS. 5, 6, and 7 illustrate an alternate preferred embodiment of the calculator assembly, denoted generally as 60'.

FIG. 5 is a partially cut-away perspective view of calculator assembly 60' positioned for entry into a receiving channel 54'. In the embodiment shown, Calculator assembly 60' includes a casing 61' includes top, bottom, and inward facing sides 65', 66', 67' and is approximately three inches high and five inches long. A channel engaging means, such as lip 64', extends outwardly from the lower edge of top, bottom and inward sides 65',66',67' for engaging channel 54' for retaining calculator assembly 60' to cover plate 42'. Calculator assembly casing 61' also includes plug/bumper means 77'.

Within casing 61', a captive calculator means includes a calculator having an accessible key board 74', display 75' and solar charger 76'.

Receiving channel 54' on the upper right corner front face 46' of cover plate 42' retains calculator assembly lip 64'. Channel 54' is shaped so as to engage lip 64' around the three sides 65',66',67'.

FIG. 6 is a sectional view, partially cut away, through the plug/bumper 77' of the calculator assembly and additionally showing the attachment to the holder 20'. Plug/bumper 77' functions similarly to that of FIG. 1 except it is an integral part of the calculator assembly casing 61' and retains the calculator assembly 60' in the channel 54' and protects the calculator 70' from blows. Fasteners 78' pass through bores 79' in cover plate 42' to fasten plug/bumper 77' to cover plate 42'. Thus, to remove the calculator casing, the cover plate 42' must first be released and rotated.

Hinge 80' is an alternate version of that of FIG. 1 and functions similarly.

FIG. 7 is a sectional view taken on line 7—7 of FIG. 5 through captive calculator 70'. Casing 61' has a slanted display wall 160' including display face 162' and an inner face 164'. Display wall 160' has a bottom end disposed further from cover plate face 46' so that the face 162' faces slightly upward to provide for easier reading when in use on a shopping cart or the like. Casing 61' includes means, such as groove 68', for holding calculator 70' so that it can be used. In the preferred embodiment, calculator top edge 71' can bear against cover plate front face 46' and does not need to be in a groove; a small amount of adhesive is sufficient to retain it securely to display wall inner face 164'.

Calculator 70' includes a waterproof keyboard 74' and display 75'. Means, such as orifice 174', is provided in display wall 160' for access to keyboard 74'. Display wall 160' is transparent over the display 75'.

Preferably, a solar panel means 76' is connected to calculator 70' for charging it. Solar panel means 76' is mounted to display wall inner face 164'. Display wall 160' is transparent above solar panel 76' such that light may strike the panel and generate electricity.

Figure 3:
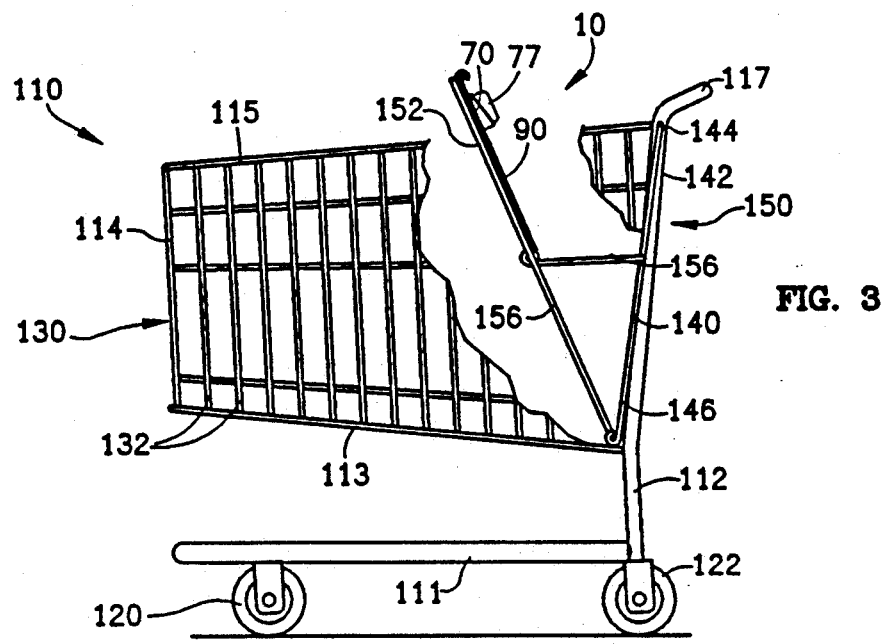
FIG. 3 is a left side elevation view of a typically telescopingly nestable shopping cart having an upper rearward receptacle including the advertising display device of FIG. 1.
Figure 4:
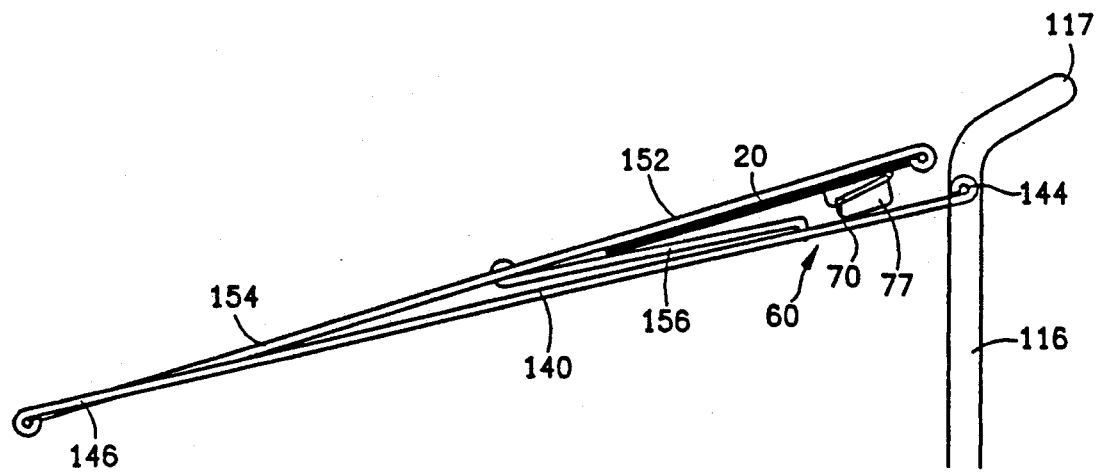
FIG. 4 is an enlarged left side view of a the shopping cart rear gate, upper rearward receptacle, and advertising display device of FIG. 3 moved to the raised and collapsed position assumed during cart nesting.

Turning now to FIGS. 3 and 4, and more particularly first to FIG. 3, there is shown in left side view the advertising display device 10 in combination with a shopping cart, denoted generally as 110. Shopping cart 110 is of a common type used in American supermarkets and is telescopingly nestable for storage and transport.

Shopping cart 110 includes frame members 111–117, including a rear transverse handle 117. A pair of castored front wheels 120 and a pair of fixed position rear wheels 122 support the cart lower frame 111.

The main forward receptacle 130 has open work wire enclosure of rods 132. Main forward receptacle 130 is cantilevered from rear frame 116 and tapers rear to front such that carts 110 can be telescopically nested from the rear for storage. Lower frame 111 is likewise tapered.

A rear gate 140 includes a top end 142 that is transversely hinged, such as by hinge 144 and a free bottom end 146 that is captive within main receptacle 130 but that ma freely swing forward and upward through main receptacle 130, as seen if FIG. 4, upon rear entry of another cart main receptacle for nesting.

A rearward upward receptacle, denoted generally as 150, is located in the upper rear of the cart 110. Rear receptacle 150 may be used to carry a small child. The upper portion of rear gate 140 serves as the rear wall of rear receptacle 150. Rear receptacle 150 includes a front wall 152 to which advertising display device 10 is attached. In this position, display ad 90 is highly visible and calculator 70 is easily accessible.

Rear receptacle front wall includes supports 154 that are hingedly connected at their lower end to rear gate lower end 146, and a bottom or seat 156. Seat 156 includes a front end that is transversely hingedly connected to front wall 152 and a rear end that is upwardly slideably connected to rear gate 140, such that upon forward and upward rotation of rear gate 140 to allow entry of a nested cart forward receptacle, rear receptacle 150 collapses as seen in FIG. 4 such that front wall 152 lies adjacent rear gate 140. As can seen in FIG. 4, calculator assembly 60 is disposed sufficiently high such that, in the collapsed position, it is not struck by seat 156. Bumper 77 protects calculator 70 from impact.

Calculator assembly 60 is also sufficiently to one side of rear receptacle 150 so as to be usable even with a child in the receptacle 150.

Figure 8:
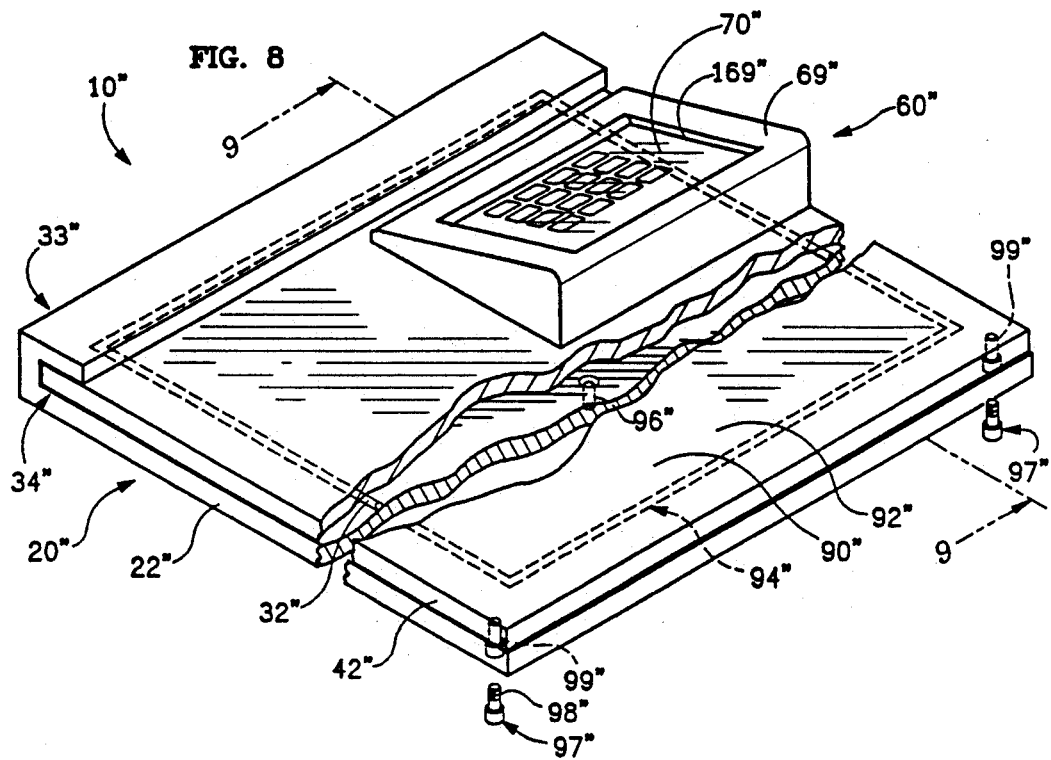
FIG. 8 is a partially cut away perspective view of an alternate preferred embodiment of the waterproof advertising display device of the present invention.
Figure 9:
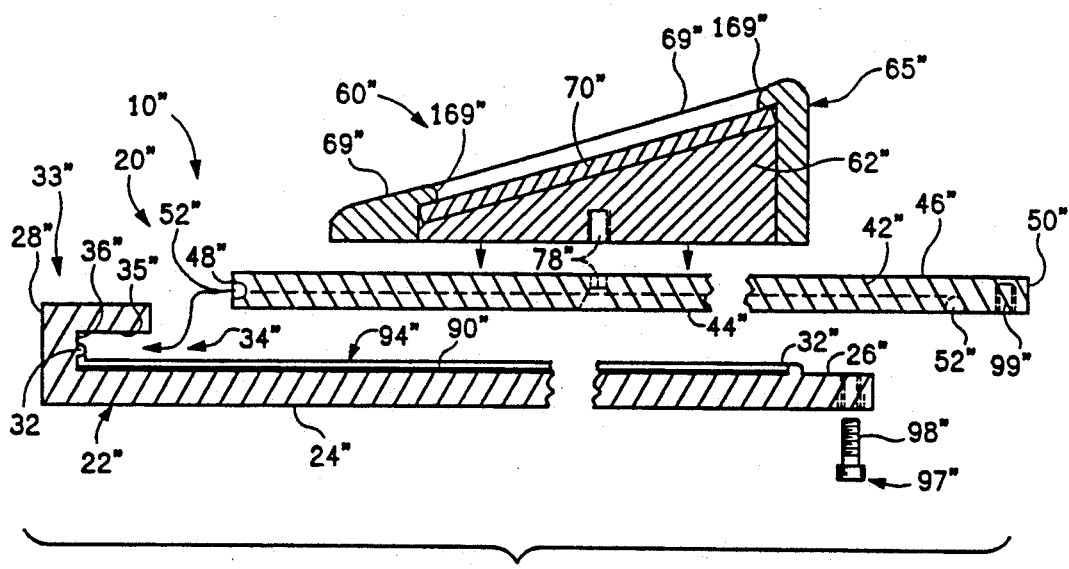
FIG. 9 is an exploded broken transverse cross-section view taken on line 9—9 of FIG. 8.

Turning now to FIGS. 8 and 9, there is shown an alternate preferred embodiment of the waterproof shopping cart display device 10' of the present invention. FIG. 8 is a partially cut away perspective view and FIG. 9 is an exploded broken transverse cross-section view taken on line 9—9 of FIG. 8.

Display device 10" is generally similar to display device 10 and 10' shown in FIGS. 1-7 and includes an advertising holder 20" and a calculator assembly 60".

Advertising holder 20" generally comprises a rear plate or display plate 22" and a front plate or cover plate 42". Display ad 90" is placed or sandwiched into a display area 92" between display plate 22" and cover plate 42". Display plate 22" includes a back face 24", front face 26", a top end 28" and a bottom edge 30". Cover plate 42" includes a back face 44", a front face 46", a top edge 48" and a bottom edge 50". Display plate top end 28" includes means, such as channel section 33" including a channel 34", for retaining cover plate top end 48". In the preferred embodiment, display plate top end 48" is J-shaped to form interior channel 34" that includes a top side wall 35" and an end wall 36". Cover plate 42" is transparent over the display area 92" so that the display ad 90" therein is visible. Both plates 22",42" are preferably made of transparent material, such as plastic.

Sealing means, such as mating tongue and groove means, denoted generally as 94", surrounds display area 92" and prevents liquid and dirt from reaching display ad 90". Sealing means 94" includes a tongue 32" protruding from display plate 22". Tongue 32" protrudes from display plate and surrounds and delineates display area 92", typically in the form of a rectangle. At the cover plate top end retaining means, tongue 32" is disposed on end wall 36". Tongue 32 also serves as retainer for display ad 90. A receiving groove 52" in cover plate 42" mates with tongue 32" to form a watertight seal. Receiving groove 52" surrounds display area 92" and is disposed on top edge 48" where it mates with tongue 32" in channel 34".

Cover plate 42" is retained to display plate 22". At the top end, channel 34" or mating tongue 32" on end wall 36" prevents outward movement of cover plate 42". At the bottom end, fastening means prevents all relative movement of plates 22", 42". Screws, denoted generally as 97", include threaded portion 98" that passes through display plate 22" and terminates in blind threaded hole 99" in cover plate 42", preferably outside of display area 92". Preferably also, screws 97" require a special tool or key to operate so that unauthorized persons may not remove cover plate 42". Although screws 97" are shown, other suitable fasteners are contemplated such as those shown in FIG. 2.

Cover plate 42" is attached to display plate 22" by inserting cover plate top edge 48" into channel 34", mating groove 52" with tongue 32" and attaching fasteners 97". It can be seen that the channel tongue 32" will hold cover plate top edge 48" in position once cover plate bottom end is secured with fasteners 97".

Holder 20" is adapted to be attached to a shopping cart or the like with means, such as rivets 96" through display plate 22". Sealing means, such as a resilient sealant, may be used for sealing the rivet aperture as part of the waterproofing.

Calculator assembly 60" is attached to cover plate front face 46" near top edge 48" adjacent one side. Calculator assembly 60" generally includes a waterproof calculator 70" and means for holding calculator 70" for convenient use by a shopper and for protecting calculator 70" from damage. Stand-off shelf 62" supports calculator 70" at an angle relative to the holder 20", as in the previous embodiments, for more convenient use of the calculator by the shopper. Casing 61" includes lips 169" that overlap and retain calculator 70". Casing upper surface 69" acts as a bumper and protects calculator 70" from damage, such as from the shopping cart parts during storage. Stand-off shelf 62" is attached to casing 61" by any suitable means, such as by gluing, after insertion of calculator 70". Calculator assembly 60" is attached to cover plate 42" by any suitable waterproof means, such as by gluing. Alternatively, a fastener 78", properly sealed, through cover plate 62" may be used. In this manner calculator assembly 60" can be replaced if calculator 70" fails.

From the foregoing description, it is seen that the present invention provides an extremely efficient and reliable manner of displaying advertising matter and of providing a shopping calculator with a shopping cart.

Although a particular embodiment of the invention has been illustrated and described, various changes may be made in the form, composition, construcition, and arrangement of the parts herein without sacrificing any of its advantages. For example, the waterproof display device may be attached to a cart at another location and the holder may be used without the calculator assembly. Therefore, it is to be understood that all matter herein is to be interpreted as illustrative and not in any limiting sense and it is intended to cover in the appended claims such modification and changes as come within the true spirit and scope of the invention.

We claim:

1. In combination: telescoping nestable shopping cart means of the type including:
   main lower forward receptacle having a front end and a rear end; said rear end including a rear opening covered by a hinged rear gate having a hinged top end and a free bottom end; and
   rear receptacle including:
   a front wall including:
   a top end; and a bottom end including:
supports hingedly connected to said rear gate toward said rear gate bottom end; and
a bottom connected between said front wall and said rear gate in a manner such that, upon nesting of carts, said rear gate bottom end swings forward and upward through said forward receptacle and said front wall collapses to a position closely adjacent said rear gate; and
an advertising holder mounted in said rear receptacle on said front wall including:
a display plate including:
a back face;
a front face including:
an advertising area for placement of advertising;
a top edge; and
a bottom edge;
cover plate means including:
a back face;
a front face
a top edge; and
a bottom edge;
said cover plate attached in planer relationship to said display plate such that said cover plate back face is adjacent said display plate front face; for covering said display plate advertising area; said cover plate over said advertising area being of transparent material; and
sealing means providing a watertight seal between said display plate and said cover plate such that liquids may not enter said advertising area from between said display plate front face and said cover plate back face;
said display plate, cover plate and sealing means providing a waterproof enclosure for said advertising area.

2. The combination of claim 1 further including:
attachment means for attaching said cover plate to said display plate including:
quick release hinge means for hingedly connecting said display plate top edge to said cover plate top edge such that cover plate is hingedly rotatable up to a release angle at which said hinge means becomes disengaged such that said plates are no longer attached with said hinge means.

3. The combination of claim 2 wherein:
said quick release hinge means is a single overlapping curl such that liquids can not enter between said plates from the top.

4. The combination of claim 1 further including:
a calculator assembly including:
a calculator attached to a stand-off shelf; said calculator including:
a top edge; and
a bottom edge; and stand-off means including:
a base attached to said cover plate front face near said cover plate top edge; and
shelf means including a stand-off shelf for supporting said calculator at an angle to said cover plate such that said calculator top edge is closer than said calculator bottom edge to said cover plate.

5. The combination of claim 4 wherein:
said shelf means includes a blind channel for insertion of said calculator; and
said calculator assembly further includes:
plug means for retaining said calculator in said channel.

6. The combination of claim 5 wherein:
said plug means includes:
a plug inserted in said channel; and
fastener means for releasingly retaining said plug in said channel; said fastener means accessible from said cover plate back face.

7. The combination of claim 4 wherein:
said calculator assembly includes:
bumper means protruding higher than said calculator for protecting said calculator from impact.

8. The combination of claim 4 wherein:
said calculator assembly is disposed such that, upon nesting of carts, said rear receptacle bottom folds up short of said calculator assembly.

9. In combination:
telescopingly nestable shopping cart means of the type including:
main lower forward receptacle having a front end and a rear end; said rear end including a rear opening covered by a hinged rear gate having a hinged top end and a free bottom end; and
rear receptacle including:
a front wall including:
a top end; and
a bottom end including:
supports hingedly connected to said rear gate toward said rear gate bottom end; and
a bottom connected between said front wall and said rear gate in a manner such that, upon nesting of carts, said rear gate bottom end swings forward and upward through said forward receptacle and said front wall collapses to a position closely adjacent said rear gate; and
an advertising holder mounted in said rear receptacle on said front wall including:
a display plate including:
a back face;
a front face including:
an advertising area for placement of advertising;
a top edge; and
a bottom edge;
cover plate means including:
a back face;
a front face including:
channel means for receiving a calculator assembly;
a top edge; and
a bottom edge; said cover plate attached in planer relationship to said display plate such that said cover plate back face is adjacent said display plate front face; for covering said display plate advertising area; said cover plate over said advertising area being of transparent material; and
sealing means between said display plate and said cover plate for preventing liquids from entering said advertising area; and
a calculator assembly inserted in said receiving channel means including:
a calculator retained on a stand-off shelf; said calculator including:
a top edge; and
a bottom edge; and stand-off means including:
a lip for insertion in said receiving channel; and
shelf means including a stand-off shelf for supporting said calculator at an angle to said cover plate such that said calculator top edge is closer than said calculator bottom edge to said cover plate.

10. The combination of claim 9 wherein:
said advertising holder further includes:
fastener means for releasingly retaining said calculator assembly in said channel; said fastener means accessible from said cover plate back face.

11. The combination of claim 10 wherein:
said calculator assembly includes:
bumper means protruding higher than said calculator for protecting said calculator from impact.

12. The combination of claim 10 wherein:
said calculator assembly is disposed such that, upon nesting of carts, said rear receptacle bottom folds up short of said calculator assembly.

13. In combination:
telescopingly nestable shopping cart means of the type including:
main lower forward receptacle having a front end and a rear end; said rear end including a rear opening covered by a hinged rear gate having a hinged top end and a free bottom end; and
rear receptacle including:
a front wall including:
a top end; and
a bottom end including:
supports hingedly connected to said rear gate toward said rear gate bottom end; and
a bottom connected between said front wall and said rear gate in a manner such that, upon nesting of carts, said rear gate bottom end swings forward and upward through said forward receptacle and said front wall collapses to a position closely adjacent said rear gate; and
an advertising holder mounted in said rear receptacle on said front wall including:
a display plate including:
a back face;
a front face including:
an advertising area for placement of advertising;
a top end including:
a bottom edge;
cover plate means including:
a back face;
a front face
a top edge; and
a bottom edge;
sealing means providing a watertight seal between said display plate front face and said cover plate back face peripheral to said advertising area such that liquids may not enter said advertising area from between said display plate front face and said cover plate back face; said sealing means comprising:
mating tongue and groove means; and
attaching means for attaching said cover plate in planer relationship to said display plate such that said cover plate back face is adjacent said display plate front face; for covering said display plate advertising area; said cover plate over said advertising area being of transparent material;
said display plate, cover plate and sealing means providing a waterproof enclosure for said advertising area.

14. The combination of claim 13 wherein:
said display plate top end includes:
a forward extending end wall; and
a portion of said sealing mating tongue and groove means is disposed along said end wall.

15. The combination of claim 13 wherein:
said display plate top end includes:
a channel for receiving said cover plate top end.

16. The combination of claim 13 further including:
a calculator assembly including:
a calculator held to a stand-off shelf; said calculator including:
a top edge; and
a bottom edge; and stand-off means including:
a base attached to said cover plate front face near said cover plate top edge; and
shelf means including a stand-off shelf for supporting said calculator at an angle to said cover plate such that said calculator top edge is closer than said calculator bottom edge to said cover plate.

17. The combination of claim 16 wherein:
said calculator assembly is disposed such that, upon nesting of carts, said rear receptacle bottom folds up short of said calculator assembly.

18. The combination of claim 1 wherein:
said sealing means provides a watertight seal between said display plate front face and said cover plate back face peripheral to said advertising area.

19. The combination of claim 9 wherein:
said sealing means disposed between said display plate front face and said cover plate back face outside of said advertising area.

* * * * *